J. T. BRENT, SECOND.
MOLDING MACHINE.
APPLICATION FILED SEPT. 11, 1906.
913,194.
Patented Feb. 23, 1909.
4 SHEETS—SHEET 3.
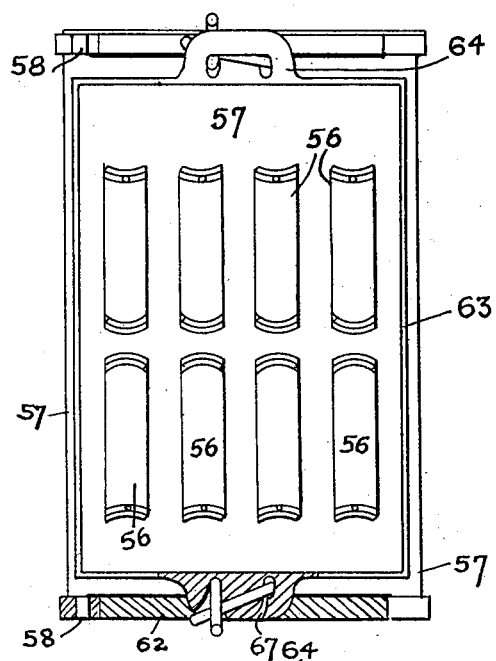
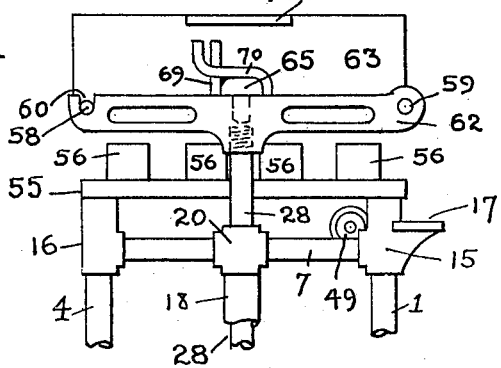
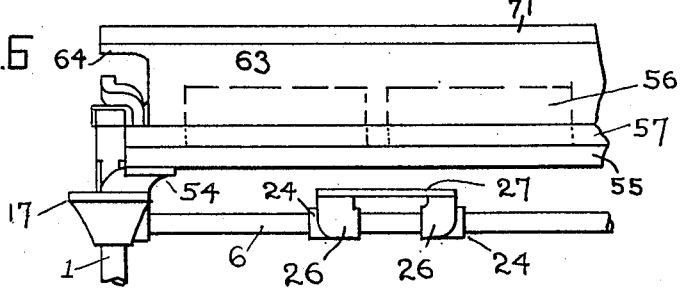

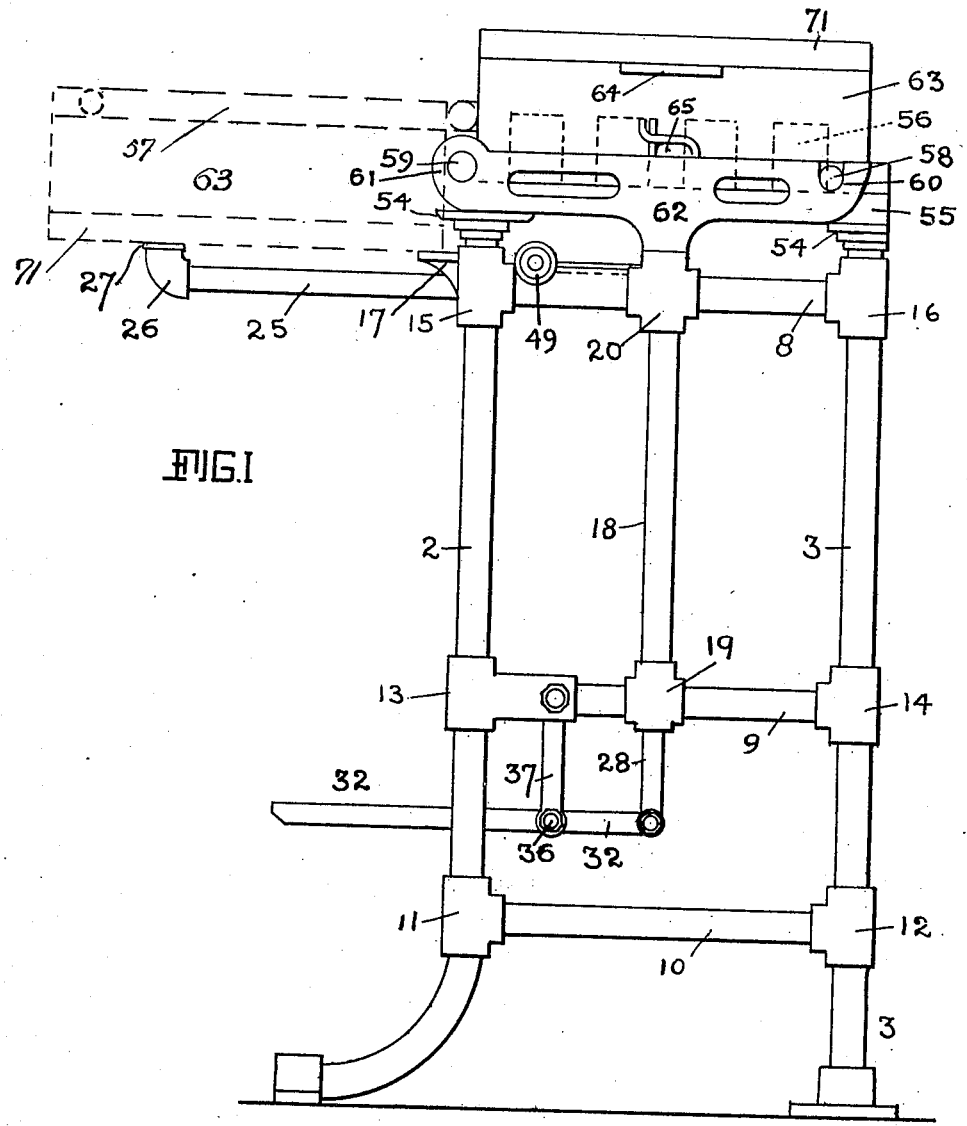

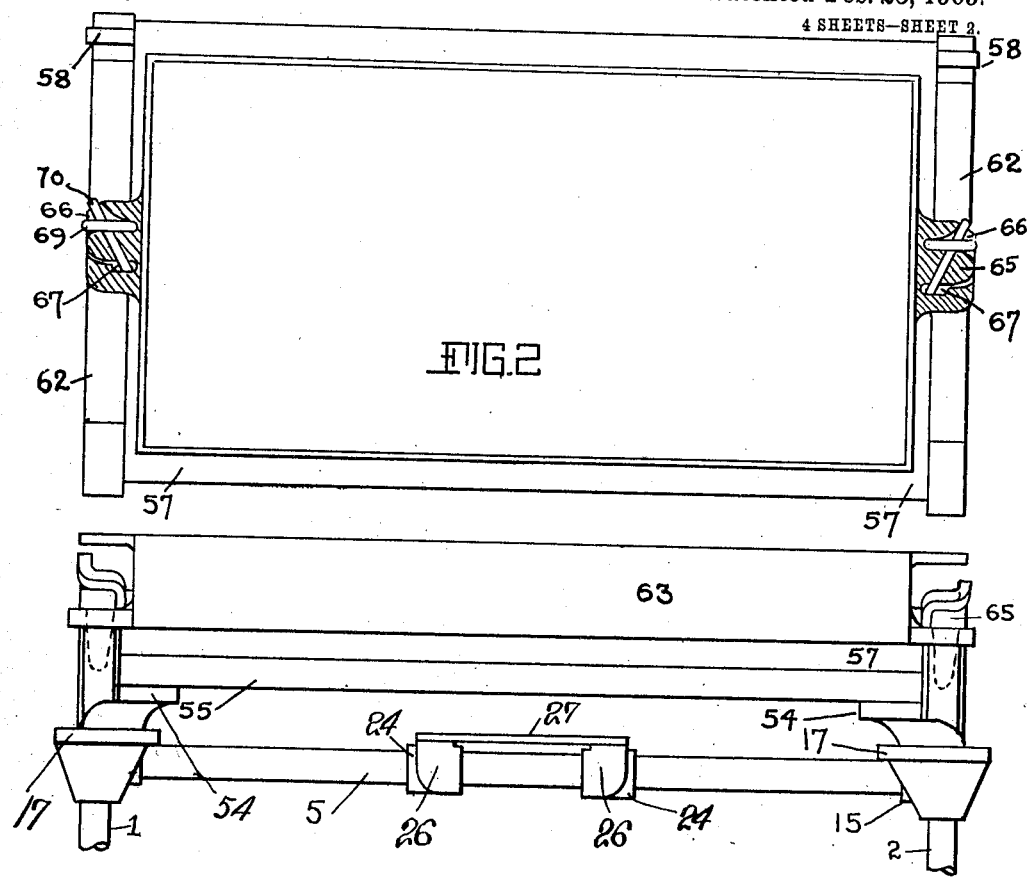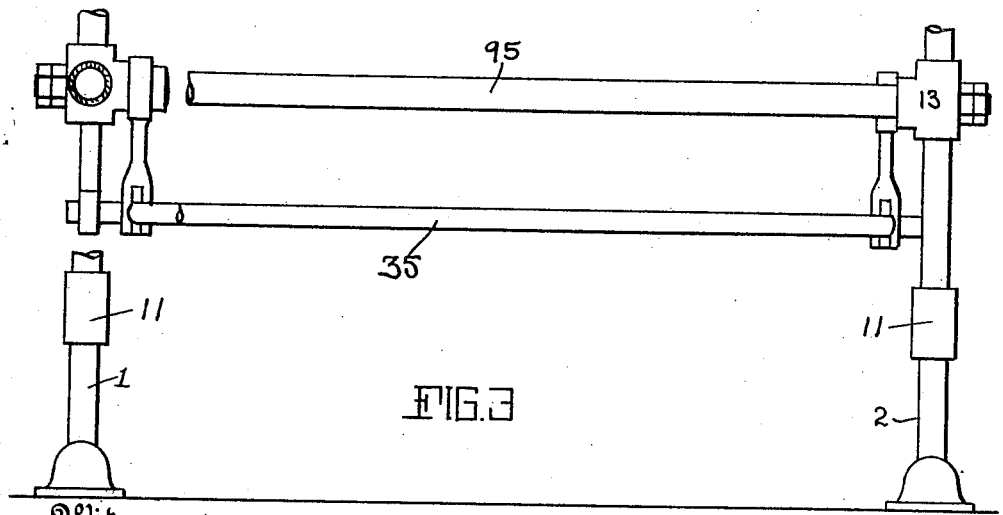

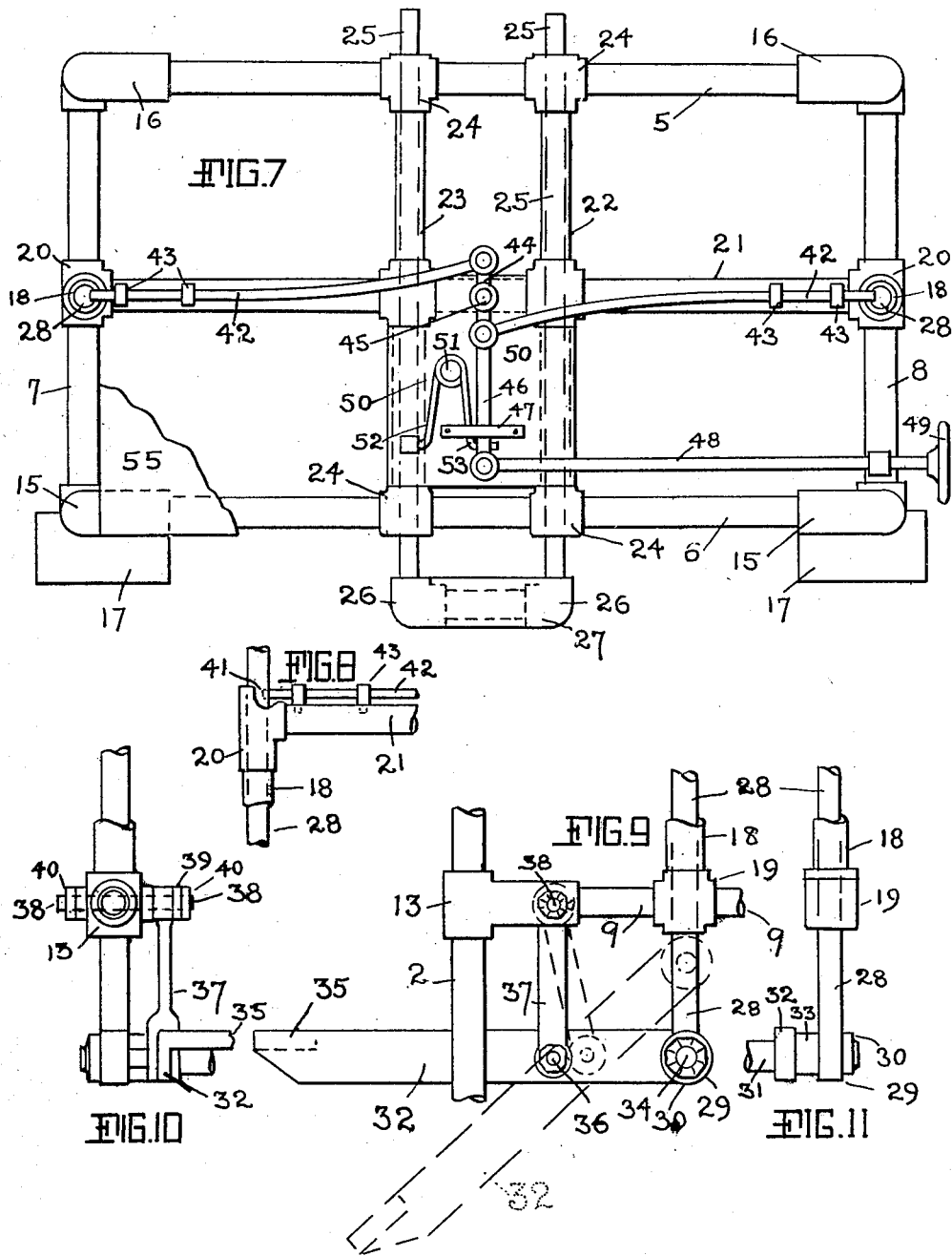

UNITED STATES PATENT OFFICE.

JOHN THOMAS BRENT, SECOND, OF COLD SPRING, NEW YORK, ASSIGNOR OF ONE-HALF TO JAMES BENNETT SOUTHARD, OF COLD SPRING, NEW YORK, AND ONE-HALF TO BERGEN FOUNDRY, OF JERSEY CITY, NEW JERSEY, A CORPORATION OF NEW JERSEY.

MOLDING-MACHINE.

No. 913,194.  Specification of Letters Patent.  Patented Feb. 23, 1909.

Application filed September 11, 1906. Serial No. 334,093.

*To all whom it may concern:*

Be it known that I, JOHN THOMAS BRENT, Second, a citizen of the United States of America, residing at Cold Spring, in the county of Putnam and State of New York, United States of America, have invented a new and useful Molding-Machine; and I do hereby declare the following to be a full, clear, and exact description of the same.

The present improvements relate to machines for making sand-molds, especially molds employed in the casting of small metallic articles, such as sash-weights or sash-weight units of the kind described and claimed in the United States Patents No. 826705 and No. 826707, both dated July 24, 1906, and granted upon applications filed by me.

The object of my invention is to provide a molding machine which will permit the careful separation of the packed flask from the pattern-board, rigidly sustain said flask while turning the same, and will deposit the reversed flask at the exact point desired without any jarring or rough or unsteady handling, and, as a consequence, the laborer using my machine is able to produce a greater number of complete and satisfactory flasks than heretofore.

The preferred embodiment of my invention illustrated in the accompanying drawings is an exceedingly simple and strong machine, and may be employed to reverse a packed flask, after separation from the pattern board, or to permit the flask to be removed without being reversed.

Referring to the accompanying drawings, Figure 1 is a side view of the complete machine, the flask being shown, by dotted lines, also in reversed position; Fig. 2 is a plan view of the machine, the bottom-board and part of the flask being removed; Fig. 3 is a front view of the machine, with parts of the frame broken away; Fig. 4 is a view somewhat similar to Fig. 2, showing the patterns; Fig. 5 is a side view of the upper part of the machine, showing the flask-support, carrying the stripping-board and flask, raised to, separate from the patterns; Fig. 6 is a view from the rear of the machine, of a part thereof; Fig. 7 is a top view of the frame of the machine, the pattern-board and flask support being omitted; Fig. 8 shows a detail of the device for locking the flask-support in its raised position; Fig. 9 shows a detail of Fig. 1, illustrating the connection of the rods with the treadle and the support for the latter; Fig. 10 shows a detail of said support, and Fig. 11 shows the connection of the treadle with one of the rods.

The machine shown is provided with a rectangular crate-like frame or body, and I have preferred to employ, so far as possible for this purpose, ordinary commercial and easily-assembled metallic pipes or rods and ordinary pipe couplings or pipe-fittings at the intersections of the bars. As a result, I produce a base-frame quickly and cheaply, and one having great strength and lightness.

The base-frame shown in the drawings comprises four corner-uprights, such as pipes or rods 1, 2, 3 and 4, and the frame is also provided with top bars or pipes 5, 6, 7, and 8, and is further strengthened by the horizontal side bars or pipes 9 and 10 and by longer horizontal bars or pipes (such as 95, Fig. 3) at the front or rear of the frame.

The pipe-couplings or pipe-fittings employed may be of any suitable form, such as the three-way fittings 11, and the four-way fittings 12, 13 and 14. I prefer, however, that the top-bars 6, 7 and 8 and the front uprights 1 and 2 shall be connected by castings or fittings 15, 15, provided with forwardly-disposed shelves or supports 17, 17, while the top bars 7, 5 and 8 and the rear uprights 3 and 4 shall be connected by ordinary fittings or pipe-couplings 16, 16. I also prefer that above the couplings 15, 15, and 16, 16, there shall be supports 54 which, as shown in Figs. 1, 3 and 6, directly support the pattern-board. If desired, supports 54 may (see Figs. 3 and 6) be cast directly upon the coupling or fitting, or may (as shown in Fig. 1) be the upper ends of cast or wrought plates screwed into engagement with the couplings or fittings.

At its opposite sides, the frame has hollow upright pipes or tubes 18, disposed midway between the corner uprights, and such hollow uprights 18 are secured in place by the four-way couplings or fittings 19 and 20 which engage respectively with the bars 8 and 9.

Across the top of the upper part of the frame, I prefer to secure a brace, such as a tube 21, connecting with both bars 7 and 8, by means of fittings 20, and I also prefer to employ parallel tubes 22 and 23 running from front to rear of the machine, and connected with the tubes 5, 6 and 21 by four-way couplings or fittings 24. This results in producing sleeves or housings comprising both tubes 22 and 23 and the couplings 24, wherein I slidably secure rods 25 (see, especially, Fig. 7), which are connected, at the front of the machine, by a short tube and by the fittings 26, 26, engaging said tube and the rods 25. A plate 27 (see Figs. 1, 6 and 7) is secured across said fittings, and serves, as described hereinafter, for the flask when inverted.

As stated, the uprights 18 are hollow or tubular, and serve as means for guides for raising and lowering (as hereinafter described) a flask-support. For this purpose, each upright 18 contains a rod 28, fitted therein so as to freely slide, and the upper ends of the two rods 28 are provided (see Fig. 5) with threads for engagement with members of a flask-support, and freely slide past the pattern-board and patterns.

The lower end of each rod (see especially Figs. 9 and 11) is enlarged at 29, and pivotally fits the reduced end 34 of a bar 31, being held between a nut 30 and a washer 33, which in turn bears against an enlarged end of a treadle side-arm 32, said enlarged end having an opening which surrounds the reduced end of bar 31. The two treadle side-arms are formed of a single flat bar of metal, and are connected by the integral cross-piece 35 (constituting the treadle proper) running across the frame at the front thereof.

Each side-arm 32 is suspended from and pivotally connected with the frame, by means of a link 37, the lower end of which is forked and straddles the side-arm (a pin 36 and nut passing through the side-arm and both forks), while the upper end of said link 37 is provided with an opening which loosely surrounds a pin 38. The last-named pin passes through the rearward extension of the pipe-fitting 13, and the pin is held to place (and the link retained thereon) by the nuts 40 and washer 39.

I have heretofore stated that the rods 28 are slidable in the uprights 18, to raise and lower the flask-support. By preference, I provide the machine with means for locking the rods in the raised position. For this purpose each rod 28 may have (see Fig. 8) a recess 41 at one edge, and each such recess is entered, when the rods are raised, by a bolt 42 (Fig. 7). The two bolts 42 are maintained in proper position by rings 43 secured in pairs upon the horizontal bar or tube 21, and the two bolts 42 are pivotally secured upon a lever 44 at opposite sides of a pivot pin 45. The long arm 46 of the lever slides under a metal strap 47, and the extremity of said arm is pivotally connected with one end of a long rod 48, the other end of which (at the outside of the frame) bears a knob 49.

The pivot pin 45 and the strap 47 are secured to a plate 50 of sheet steel or other metal, suitably secured to the bars or tubes, 6. Said plate 50 also bears a pin 51, and a spring is curled around said pin in such manner as to have one arm 52 thereof bear against a fixed projection while the other end 53 tends to press the arm 46 outwardly, and thus always hold the bolts 42 ready to enter the sockets 41 when presented by the rising of the bars.

To the upper end of the frame a pattern-board 55, of any usual construction, is secured, as for instance by fastening to the castings 54. Upon said pattern-board any number of patterns 56, are secured. In the drawings (especially Fig. 4) I have shown patterns for making molds from which weight-units are subsequently to be cast.

A stripping-board 57 is provided of any usual construction, and I have a stripping-board which, at one end has pins 58 and at the other end has pivot pins 59. The first-named pins are adapted to snugly fit into and readily rise from the sockets 60 in the rear ends of a pair of castings or side-frames 62, while the pins 59 are adapted to hinge into openings formed in the enlarged forward ends of said castings or side frames. The stripping-board is provided with openings which exactly and closely fit around the patterns.

Upon the stripping-board referred to and at each side end thereof, I secure an upwardly projecting fixed pin 69, each of which pins may consist of a short heavy steel wire bent upwardly and outwardly.

A flask 63, is adapted to be placed on the stripping board. Said flask may consist of a hollow rectangular frame 63, and be provided at its opposite sides near its top edge, with outwardly-projecting plates 64, constituting handles, and with projecting blocks 65 at its sides near its bottom edge. Each block 65 has two slots 66 and 67, the first adapted to permit the pin 69 to pass therethrough, and the second carrying a movable pin 70 in shape corresponding to the pin 69.

In use, the parts are assembled, with the flask-support lowered as shown in Fig. 6 and the locking pin 70 is swung so as to be under the fixed pin 69, whereupon the flask is locked to the stripping-plate which thus fits around the patterns 56 projecting therethrough. Sand is then packed into the flask, and a bottom board 71 is secured thereon, as shown in Fig. 1. The workman then presses upon the treadle 35, causing it and the links 37 to swing to the positions shown by dotted lines in Fig. 9, and forcing the rods 28 to rise and carry upwardly therewith the side-frames 62 to the position shown by dotted lines in Fig. 1 and by full lines in Fig. 5. This results in raising the stripping-plate and the flask, with the packed sand. At that time, the flask may be immediately unlocked and removed or may be reversed. If the latter operation is to be performed, the workman grasps the handles 64, and swinging the stripping-board and the flask about the pivots 59, reverses the mold and rests the same (with the bottom-board 71 lowermost) upon the shelves 17 and upon the plate 27 previously drawn forwardly to the position shown in Fig. 1. If desired, the table or plate 27 may be slid back when each flask is to be packed, and brought forward when each flask is to be reversed.

What I claim is:

1. In a molding machine, a frame, a pattern-holding board secured thereto, a flask-support, a stripping board carried thereby, connections for raising and lowering the flask-support and stripping-board relatively to the pattern-holding board, and a sliding bolt and a spring operating the same for locking the flask-support in raised position.

2. In a molding machine, a frame, a pattern-holding board secured thereto, a flask-support, a stripping-board carried thereby, connections for raising and lowering the flask-support and stripping-board relatively to the pattern-holding board, a sliding bolt and a spring operating the same for locking the flask-support in raised position, and a knob for moving the bolt to unlocking position.

3. In a molding machine, a frame, a pattern-holding board, a flask-support, means for moving one of said parts to and from the other, a stripping-board having a pivotal connection with the flask support and provided with means for locking the flask to the stripping-board, and a table carried by said frame and having a connection therewith to permit said table to be folded within the frame and to be positioned to receive a reversed flask carried by the stripping-board.

4. In a molding machine, a frame, comprising a pair of parallel and vertically-disposed members, a pattern-holding board, a flask support, means for moving one of said parts to and from the other, and a table arranged to receive flasks, said table having parts which slidably engage with the aforesaid vertically-disposed members of the frame.

5. In a molding machine, a frame, a pattern-board, a flask-support above said board and means for moving one of said parts from the other, said flask-support comprising a pair of side-frames each of which has a socket at one end, and a stripping-board pivotally carried by both side-frames and provided with stops which fit into the sockets aforesaid.

In testimony whereof I have signed my name to this specification in the presence of two subscribing witnesses.

JOHN THOMAS BRENT, SECOND.

Witnesses:
EDWARD E. BERRIGAN,
BENJAMIN HARMAN.